United States Patent
Nicholson et al.

(10) Patent No.: US 8,250,329 B2
(45) Date of Patent: Aug. 21, 2012

(54) PREEMPTIVE WRITE-INHIBITION FOR THIN PROVISIONING STORAGE SUBSYSTEM

(75) Inventors: Robert B. Nicholson, Southsea (GB); William James Scales, Fareham (GB); Stephen P. Legg, Southampton (GB); Carlos Francisco Fuente, Bishops Waltham (GB)

(73) Assignee: International Business Machines Corporation, Armonk, NY (US)

( * ) Notice: Subject to any disclaimer, the term of this patent is extended or adjusted under 35 U.S.C. 154(b) by 904 days.

(21) Appl. No.: 12/257,650

(22) Filed: Oct. 24, 2008

(65) Prior Publication Data
US 2009/0144499 A1 Jun. 4, 2009

(30) Foreign Application Priority Data
Oct. 24, 2007 (EP) .................................... 07119216

(51) Int. Cl.
*G06F 12/08* (2006.01)
(52) U.S. Cl. ................... 711/170; 711/152; 711/171
(58) Field of Classification Search .................. None
See application file for complete search history.

(56) References Cited

U.S. PATENT DOCUMENTS

| 7,137,119 | B1 | 11/2006 | Sankaranarayan et al. | |
|---|---|---|---|---|
| 7,577,817 | B2 * | 8/2009 | Karpoff et al. | 711/206 |
| 7,734,888 | B1 * | 6/2010 | Hamilton et al. | 711/170 |
| 2002/0116590 | A1 * | 8/2002 | Franaszek et al. | 711/170 |
| 2007/0067435 | A1 | 3/2007 | Landis et al. | |

* cited by examiner

*Primary Examiner* — Gary J Portka
(74) *Attorney, Agent, or Firm* — Jennifer M. Anda

(57) ABSTRACT

Write requests from host computers are processed in relation to a thin provisioning storage subsystem. A write request is received from a host computer. The write request identifies a first virtual disk that has been previously assigned to the host computer. It is determined whether the first virtual disk has to be allocated additional physical storage locations of the thin provisioning storage subsystem for storing data associated with the write request. In response to determining that the virtual disk has to be allocated additional physical storage locations, the following is performed. First, a quantity of free space remaining unallocated within physical storage locations of the thin provisioning storage subsystem is determined. Second, where the quantity of free space remaining unallocated within the physical storage locations satisfies a policy threshold associated with a second virtual disk, the second virtual disk is write-inhibited. The first and second virtual disks can be different.

17 Claims, 3 Drawing Sheets

PREEMPTIVE WRITE-INHIBITION FOR THIN PROVISIONING STORAGE SUBSYSTEM

RELATED APPLICATIONS

The present patent application claims priority under 35 USC 119 to the previously filed European (EP) patent application filed on Oct. 24, 2007, and assigned application no. 07119216.5.

FIELD OF THE INVENTION

The present invention relates to storage subsystems used to store data received from servers over a network.

BACKGROUND OF THE INVENTION

FIG. 1 shows a storage subsystem 13, in accordance with the prior art. The storage subsystem 13 is used to store data received from servers, such as the servers 10, 11, 12 in FIG. 1, over a storage area network (SAN) 14. Applications 101, such as a relational database management system (RDBMS), run on a server, such as the server 10. The applications 101 issue write and read commands to the storage subsystem 13 via the SAN 14. The storage subsystem 13 receives the commands and processes them accordingly, in order to store and retrieve data.

The storage subsystem 13 has a number of virtual disks 132a-132d, which are also referred to as "volumes," and which each server directly addresses when the server sends its read and write commands to the storage subsystem 13. The servers treat the virtual disks as physical storage locations. However, in actuality, each virtual disk is mapped, using a virtualization table 133, to physical storage locations on physical storage media 134a-134e. Virtual storage locations in a particular virtual disk are normally mapped to physical storage locations that are spread out over several different physical media devices 134a-134e, such as hard disk drives.

An operating system 102 on each server initially requests the storage subsystem 13 for some storage locations to which the server can address its later-issued read and write commands. The storage subsystem 13 then assigns certain virtual disks (i.e., volumes), or certain portions of virtual disks, to each server whose operating system makes such an assignment request.

A known optimization in this technology field is referred to as thin provisioning. Thin provisioning involves accommodating the situation where the operating system of each server requests more storage space than it really needs. In thin provisioning, when a server administrator makes a request for more storage, either a request for a new volume or a request for an existing volume to be expanded, the storage administrator configures the storage subsystem to use thin provisioning to allocate a new volume or expand it. If the request is for a new volume, then the operating system is provided with the new addresses of the new virtual disk that has been newly assigned to that server. However, although a new virtual disk has been assigned to the server, the server has not actually been allocated more disk space, because physical storage space on the physical storage units 134a-134e has not yet been allocated to the new virtual disk. The new virtual disk is not actually allocated any physical storage until an actual write command is received from the server.

Thin provisioning, therefore, solves the problem of a server being promised more physical storage locations than the server actually makes use of, such that storage locations are not available for other servers to use.

SUMMARY OF THE INVENTION

The present invention relates to preemptive write-inhibition for a thin provisioning storage subsystem. A method of one embodiment of the invention is for processing write requests from one or more host computers in relation to a thin provisioning storage subsystem. The method receives a write request from a host computer. The write request identifies a first virtual disk that has been previously assigned to the host computer.

The method determines whether the first virtual disk has to be allocated additional physical storage locations of the thin provisioning storage subsystem for storing data associated with the write request. In response to determining that the first virtual disk has to be allocated additional physical storage locations of the thin provisioning storage subsystem, the method determines a quantity of free space remaining unallocated within physical storage locations of the thin provisioning storage subsystem. The method then, where the quantity of free space remaining unallocated within the physical storage locations of the thin provisioning storage subsystem satisfies a policy threshold corresponding to a second virtual disk, write-inhibits the second virtual disk.

A system of an embodiment of the invention includes a thin provisioning storage subsystem, a number of virtual disks, and a mechanism. The thin provisioning storage subsystem has a number of physical storage locations. The virtual disks are defined in relation to the thin physical storage locations of the provisioning storage subsystem. Where a first virtual disk of the virtual disks has to be allocated additional physical storage locations of the provisioning storage subsystem, the mechanism is to do the following. Specifically, the mechanism is to write-inhibit a second virtual disk of the virtual disks where a quantity of free space remaining unallocated within the physical storage locations of the provisioning storage subsystem satisfies a policy threshold associated with the second virtual disk.

An article of manufacture of an embodiment of the invention includes a tangible computer-readable medium having one or more computer program parts stored thereon. The tangible computer-readable medium may be a recordable data storage medium, or another type of tangible computer-readable medium. The computer program parts are to perform a method for processing write requests from one or more requesting host computers in relation to a thin provisioning storage subsystem.

The method receives a write request from a host computer. The write request identifies a first virtual disk that has been previously assigned to the host computer. The method determines whether the first virtual disk has to be allocated additional physical storage locations of the thin provisioning storage subsystem for storing data associated with the write request. In response to determining that the first virtual disk has to be allocated additional physical storage locations of the thin provisioning storage subsystem, the method determines a quantity of free space remaining unallocated within physical storage locations of the thin provisioning storage subsystem. The method then, where the quantity of free space remaining unallocated within the physical storage locations of the thin provisioning storage subsystem satisfies a policy threshold corresponding to a second virtual disk, write-inhibits the second virtual disk.

BRIEF DESCRIPTION OF THE DRAWINGS

The drawings referenced herein form a part of the specification. Features shown in the drawing are meant as illustra

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview of Embodiments of the Invention

A problem with thin provisioning as has been described in the background section is when applications write more data than can be stored on the physical storage that is physically attached to the system. In such situations, write commands have to be failed, which will usually cause the application using the storage subsystem to stop or exit in an uncontrolled manner. This problem is exacerbated by two factors: chunking; and, the utilization of a write-back cache.

Checking means occurs when thin provisioning system is designed to allocate relatively large areas of contiguous storage in order to improve sequential performance or reduce the size of the metadata required to describe the allocation. For example, a small write command of say 4 kilobytes (KB) of data may cause the allocation of quite a large amount of storage; depending on the design this amount may be 32 KB—a factor of eight times larger—or up to as much as 16 megabytes (MB)—a factor of 4,096 times larger. As a result, scattered small writes to previously unallocated areas of storage cause allocation of very large amounts of storage. For example, if a subsystem receives 1,000 random 4 KB write commands per second and each results in an allocation of a new 16 MB chunk, then the allocation rate is 1.6 gigabytes (GB) per second.

Figure 1:
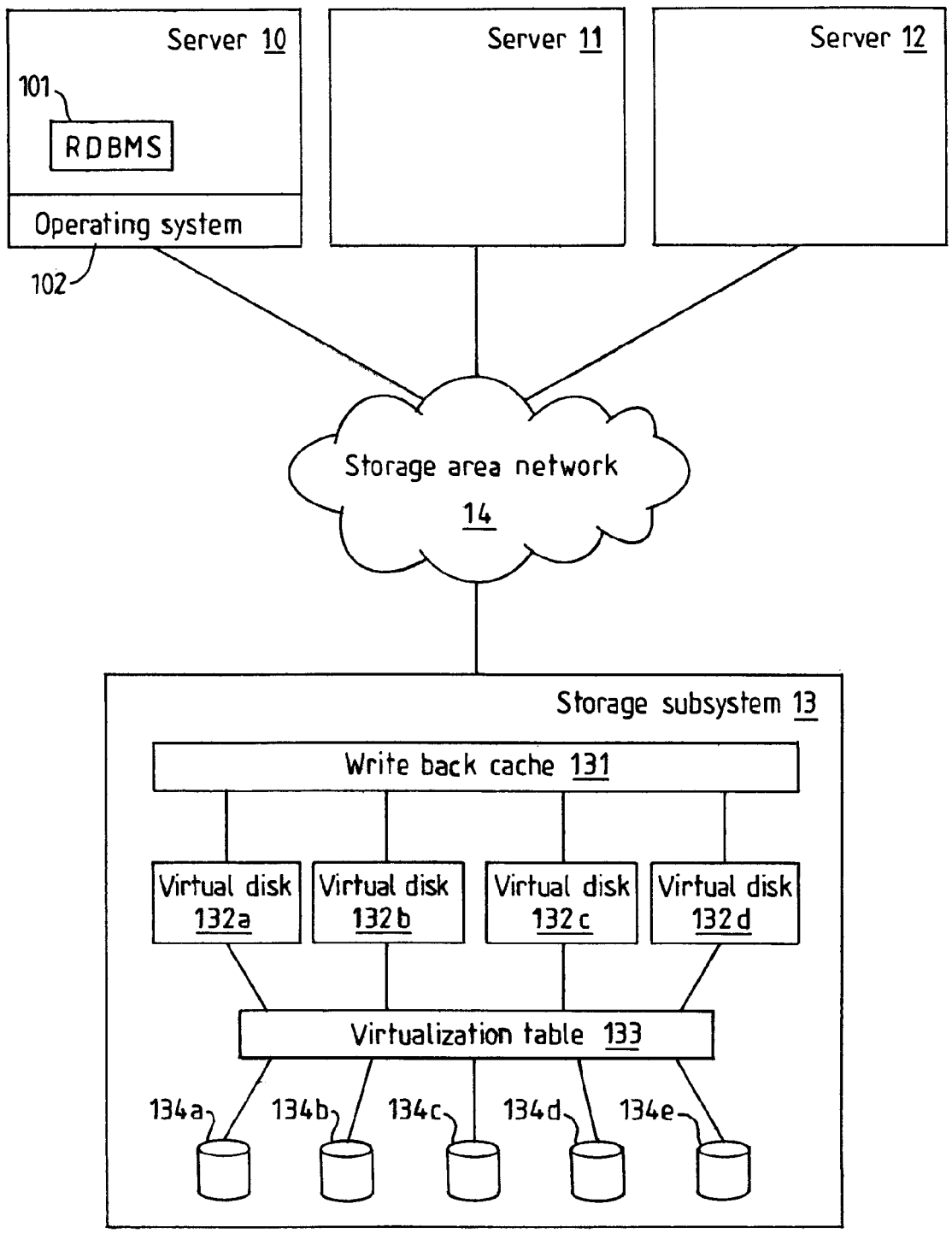
- FIG. 1 is a diagram depicting computing elements that interact with one another during operation of a storage area network, according to the prior art.

A storage subsystem implementing thin provisioning may include a write-back cache, such as the write-back cache 131 of FIG. 1. In a typical arrangement, the write back cache is placed logically "in front of" the allocation scheme. As such, blocks are allocated in the thin provisioning layer only when the blocks are de-staged (i.e., removed) from the write back cache. In a write-back caching scheme, write completion indication is returned to servers for writes before the writes are actually de-staged from the write-back cache, and at the time that completion is given, the subsystem is required to store the data persistently in a guaranteed manner. The implication is that the storage subsystem must commit to storing data before it knows if the data will cause an allocation in the thin provisioning layer. This means that, for example, for a 4 GB write-back cache storing 4 KB random writes, where each random write will cause an allocation of 16 MB, the write-back cache can theoretically hold writes that will result in the allocation of 16 terabytes (TB) of backend storage.

Possible solutions to these problems including taking thinly provisioned volumes offline when all physical storage is allocated. This unfortunately means reads and writes will fail. Alternatively, the storage can be made read-only. However, this may result in pinning data in a write-back cache if one is provided, such that at some point in time the write-back cache will become full. Additionally, alerts can be provided at preset levels of available storage. Thus, when the free space drops below a given level, a warning alert may be triggered. Some systems have multiple warning levels with multiple types of warnings. Warnings can be delivered by email, simple network management protocol (SNMP) traps, or text message. Nevertheless, the problems mentioned associated with thin provisioning systems remain, and have not been fully addressed.

Embodiments of the invention advantageously solve these problems. Volumes (i.e., virtual disks) of lesser importance are write-inhibited (e.g., taking the volume offline, or making it read-only) ahead of more important volumes. As a result, the likelihood that reads and writes will fail, or that a write-back cache, if present, will become full due to data pinning, is greatly reduced. Therefore, in accordance with embodiments of the invention, thin provisioning can be used in an environment where volumes of different importance share an over-allocated pool of storage resources. If the pool becomes resource constrained, then preference is given to more important volumes.

Detailed Discussion of an Embodiment of the Invention

Figure 2:
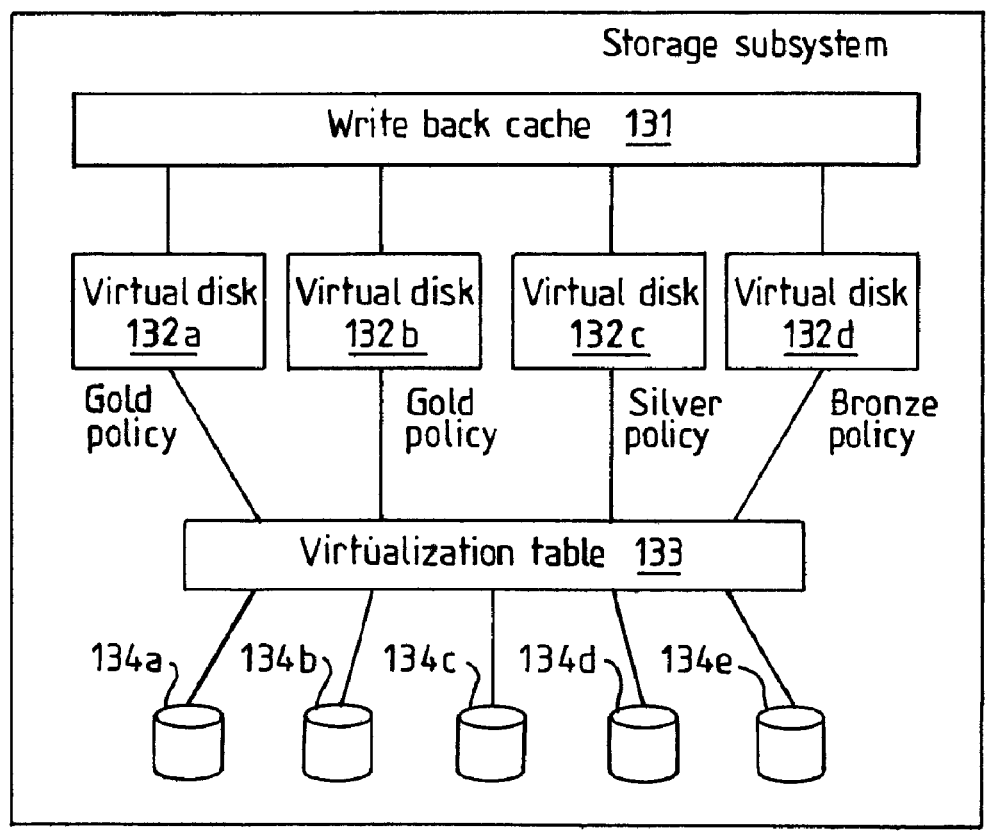
FIG. 2 is a diagram of a storage subsystem, according to an embodiment of the present invention.

FIG. 2 shows a thin provisioning storage subsystem, according to an embodiment of the invention. The subsystem of FIG. 2 may be implemented in relation to the system of FIG. 1 that has been described, as a replacement of the storage subsystem 13, for instance. A system including the subsystem of FIG. 2 is said to include a mechanism for performing write-inhibition actions, as is described in detail below. This mechanism may be the subsystem of FIG. 2 itself, or may be a different type of mechanism including hardware, software, or a combination of hardware and software.

The virtual disks 132a-d are each assigned a policy level. For example, virtual disk 132a and virtual disk 132b are assigned a gold policy level, virtual disk 132c is assigned a silver policy level, and virtual disk 132d is assigned a bronze policy level. These policy levels are used, as is described below, to determine which virtual disks are write-inhibited first, when the overall storage capacity on the physical devices 134a-134e is filling up but has not necessarily completely filled up to capacity. For example, virtual disks that are assigned the gold policy level may not write-inhibited until 100% of the storage pool has been utilized, virtual disks that are assigned the silver policy level may not write-inhibited until 90% of the storage pool has been utilized, and virtual disks that are assigned the bronze policy level may not be write-inhibited until 80% of the storage pool has been utilized. Any other percentages could, be chosen, to suit the requirements of a particular system.

Figure 3:
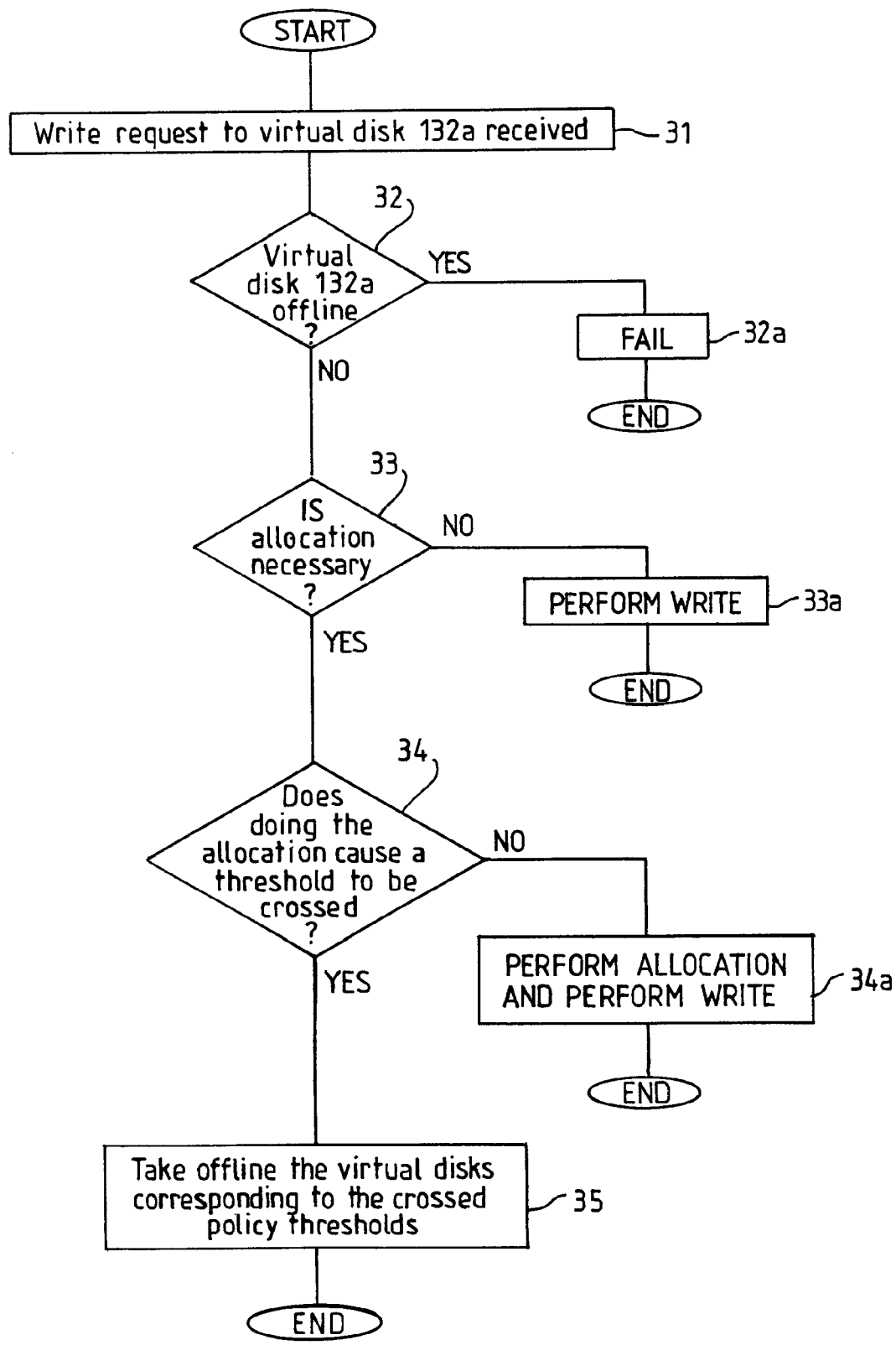
FIG. 3 is a flowchart of a method performed by and/or in relation to a storage subsystem, according to an embodiment of the present invention.

FIG. 3 shows a method depicting illustrative operation of the virtual subsystem of FIG. 2, according to an embodiment of the invention. At least some parts of the method of FIG. 3 may be performed by the mechanism that has been described.

For instance, at least some parts of the method of FIG. 3 may be performed by software running on the storage subsystem of FIG. 2.

First, a write request is received (31) at a storage subsystem, from, for example, a relational database management system (RDBMS) application running on the server 10. The operating system 102 of the server 10 may have previously been assigned the virtual disks 132a and 132b, and in this example, the RDBMS application is targeting its write request to virtual disk 132a. The storage subsystem determines whether the virtual disk 132a that is the target of the write request is offline (32). A virtual disk being offline means that the virtual disk cannot be read from or written to. If the virtual disk is offline, then the write request fails (32a).

If the virtual disk is not offline, however, then the storage subsystem determines whether, for this write operation, the physical storage locations in any of 134a-134e that are needed to carry out the write operation have already been allocated to the virtual disk 132a (33). If such allocation has already been performed, then further allocation is unnecessary. As such, the write operation is simply carried out (33a).

If, however, further allocation of physical storage locations is necessary in order to carry out the write operation, then the method of FIG. 3 performs the following. It is noted that in thin provisioning systems, as has been described, allocation of physical storage locations does not take place until a write command is received, even though the virtual disk "space" has already been promised to the server. Therefore, if this write command is the trigger point for physical storage locations to be newly allocated to a virtual disk, then the YES branch is taken at part 33. If, however, the write command does not trigger such allocation because, for example, the virtual disk has already been allocated physical storage locations in the virtualization table 133, then the NO branch is taken, and part 33a is performed, as has been described above.

Assuming that the YES branch is taken at part 33, the storage subsystem determines whether allocating the physical storage units to the virtual disk 132a will cause a threshold to be reached (34). For example, in relation to FIG. 2, if it is determined at part 34 that allocating the physical storage units to the virtual disk 132a will result in 85% of the total physical storage units 134a-134e being utilized, then the virtual disk 132d that has been previously assigned the bronze policy level is now to be taken offline. Therefore, the virtual disk 132d is write-inhibited by being taken offline (35). In another embodiment, instead of taking the virtual disk 132d offline at part 35, the virtual disk 132d instead can be write-inhibited by being made read-only.

If, however, at part 34 the storage subsystem determines that performing the allocation will not cause a threshold to be crossed, then the allocation is performed and then the write operation is carried out (34a). As another example, if at part 34, it is determined that carrying out the allocation will result in 95% of the total physical storage units being utilized, then, at part 35, the two virtual disks 132c and 132d will be taken offline, because this will cross the policy level thresholds for both the bronze policy level and the silver policy level.

In the example above, the server 10 may be performing very important functions involving online transaction processing for customers, for instance. Any interruption to this server is be avoided as much as possible, to avoid the transactions from being carried out improperly, and to avoid customers from possibly losing money. This is why in the example, then, the virtual disks assigned to this server have the gold policy level.

By comparison, assume that the server 11 is performing payroll processing functionality. This functionality has a lower level of importance as compared to online transaction processing, so the virtual disks assigned to the server 11 have the silver policy level. Finally, to conclude this example, assume that the server 12 is being used by students to perform software tests for research projects. This may be considered functionality that has an even lower level of importance as compared to the functionality performed by the other two servers, so the virtual disks assigned to the server 12 have the bronze policy level.

Thus, by write-inhibiting virtual disks assigned the silver and the bronze policy levels, these virtual disks are prevented from consuming any further physical storage so that all remaining free physical storage in physical storage units 134a-134e is instead available for allocation to the virtual disks 132a and 132b that are assigned the gold policy level. Therefore, this helps ensure that physical storage units will always be available to the most important applications.

When a virtual disk is write-inhibited, any write commands for that virtual disk are failed back to the server that initiated the commands, such as with a small computer system interface (SCSI) error code indicating that the virtual disk is write-inhibited. Each virtual disk 132a-132d is assigned a policy level. Examples of policy levels include gold, silver, or bronze, or any other type of ordered level naming or numbering structure, like high, medium", low, or assigning numbers to indicate ascending or descending levels of priority. The policy level can be assigned to a given virtual disk by, for example, an administrator using a graphical user interface. The policy levels may also be altered by an administrator once the storage subsystem is in operation.

The software of the storage subsystem may also be programmed to bring virtual disks back online if, for example, the amount of free storage space in the physical storage units is increased such that the policy threshold percentage in question is no longer satisfied. A write-back cache, such as the write-back cache 131, can further be used to gather together the write commands in advance of presenting them to the rest of the storage subsystem. In this case, allocation occurs once the write commands are de-staged (i.e., removed) from the cache.

When a volume is taken offline, it may be an implementation decision as to whether to hold data pinned in the write-back cache until the volume comes back online or to allow it to be de-staged. Pinning the data in the cache reduces the amount of cache available for other volumes, but prevents an offline volume consuming more than its fair share of disk space. Conversely, allowing de-staging frees up the cache at the expense of potentially allocating more of the storage pool to the volume.

CONCLUSION

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. For example, a write-back cache may or may not be employed. Therefore, it is manifestly intended that this invention be limited only by the claims and equivalents thereof.

We claim:

1. A method for processing write requests from one or more host computers in relation to a thin provisioning storage subsystem, comprising:

receiving a write request from a host computer, the write request identifying a first virtual disk that has been previously assigned to the host computer;

determining whether the first virtual disk has to be allocated additional physical storage locations of the thin provisioning storage subsystem for storing data associated with the write request;

in response to determining that the first virtual disk has to be allocated additional physical storage locations of the thin provisioning storage subsystem, determining a quantity of free space remaining unallocated within physical storage locations of the thin provisioning storage subsystem;

where the quantity of free space remaining unallocated within the physical storage locations of the thin provisioning storage subsystem satisfies a policy threshold corresponding to a second virtual disk, write-inhibiting the second virtual disk, wherein each virtual disk of a plurality virtual disks, including the first virtual disk and the second virtual disk, is assigned a policy threshold, the policy threshold assigned to each virtual disk having a different threshold percentage indicating that the virtual disk is to be write-inhibited when the quantity of free space remaining unallocated within the physical storage locations of the thin provisioning storage subsystem decreases below the different threshold percentage.

2. The method of claim 1, wherein the second virtual disk is a different virtual disk than the first virtual disk.

3. The method of claim 1, further comprising storing the write request received from the host computer in a cache, after the write request is received at the storage system from the host computer.

4. The method of claim 1, wherein write-inhibiting the second virtual disk comprises taking the second virtual disk offline.

5. The method of claim 4, further comprising bringing the second virtual disk back online when the quantity of free space remaining unallocated within the physical storage locations of the thin provisioning storage subsystem increases back above the different threshold percentage of the policy threshold.

6. The method of claim 1, wherein write-inhibiting the second virtual disk comprises taking the second virtual disk offline.

7. The method of claim 6, further comprising bringing the second virtual disk back online when the quantity of free space remaining unallocated within the physical storage locations of the thin provisioning storage subsystem no longer satisfies the policy threshold.

8. The method of claim 1, wherein write-inhibiting the second virtual disk comprises making the second virtual disk read-only.

9. A system comprising:

a thin provisioning storage subsystem comprising a plurality of physical storage locations;

a plurality of virtual disks defined in relation to the thin physical storage locations of the provisioning storage subsystem;

a mechanism to, where a first virtual disk of the virtual disks has to be allocated additional physical storage locations of the provisioning storage subsystem, write-inhibit a second virtual disk of the virtual disks where a quantity of free space remaining unallocated within the physical storage locations of the provisioning storage subsystem satisfies a policy threshold associated with the second virtual disk, wherein each virtual disk of the virtual disks is assigned a policy threshold, the policy threshold assigned to each virtual disk having a different threshold percentage indicating that the virtual disk is to be write-inhibited when the quantity of free space remaining unallocated within the physical storage locations of the thin provisioning storage subsystem decreases below the different threshold percentage.

10. The system of claim 9, wherein the second virtual disk is different than the first virtual disk.

11. The system of claim 9, wherein the mechanism is to write-inhibit the second virtual disk by taking the second virtual disk offline, and wherein the mechanism is to bring the second virtual disk back online when the quantity of free space remaining unallocated within the physical storage locations of the thin provisioning storage subsystem increases back above the different threshold percentage of the policy threshold associated with the second virtual disk.

12. The system of claim 9, wherein the mechanism is to write-inhibit the second virtual disk by taking the virtual disk offline.

13. The system of claim 9, wherein the mechanism is to write-inhibit the second virtual disk by making the second virtual disk read-only.

14. An article of manufacture comprising a tangible computer-readable medium having one or more computer program parts stored thereon to perform a method for processing write requests from one or more requesting host computers in relation to a thin provisioning storage subsystem, the method comprising:

receiving a write request from a host computer, the write request identifying a first virtual disk that has been previously assigned to the host computer;

determining whether the first virtual disk has to be allocated additional physical storage locations of the thin provisioning storage subsystem for storing data associated with the write request;

in response to determining that the first virtual disk has to be allocated additional physical storage locations of the thin provisioning storage subsystem, determining a quantity of free space remaining unallocated within physical storage locations of the thin provisioning storage subsystem;

where the quantity of free space remaining unallocated within the physical storage locations of the thin provisioning storage subsystem satisfies a policy threshold corresponding to a second virtual disk, write-inhibiting the second virtual disk, wherein each virtual disk of a plurality virtual disks, including the first virtual disk and the second virtual disk, is assigned a policy threshold, the policy threshold assigned to each virtual disk having a different threshold percentage indicating that the virtual disk is to be write-inhibited when the quantity of free space remaining unallocated within the physical storage locations of the thin provisioning storage subsystem decreases below the different threshold percentage.

15. The article of manufacture of claim 14, wherein the second virtual disk is different than the first virtual disk.

16. The article of manufacture of claim 14, wherein write-inhibiting the second virtual disk comprises taking the second virtual disk offline.

17. The article of manufacture of claim 14, wherein write-inhibiting the second virtual disk comprises making the second virtual disk read-only.

* * * * *